Figure 1:
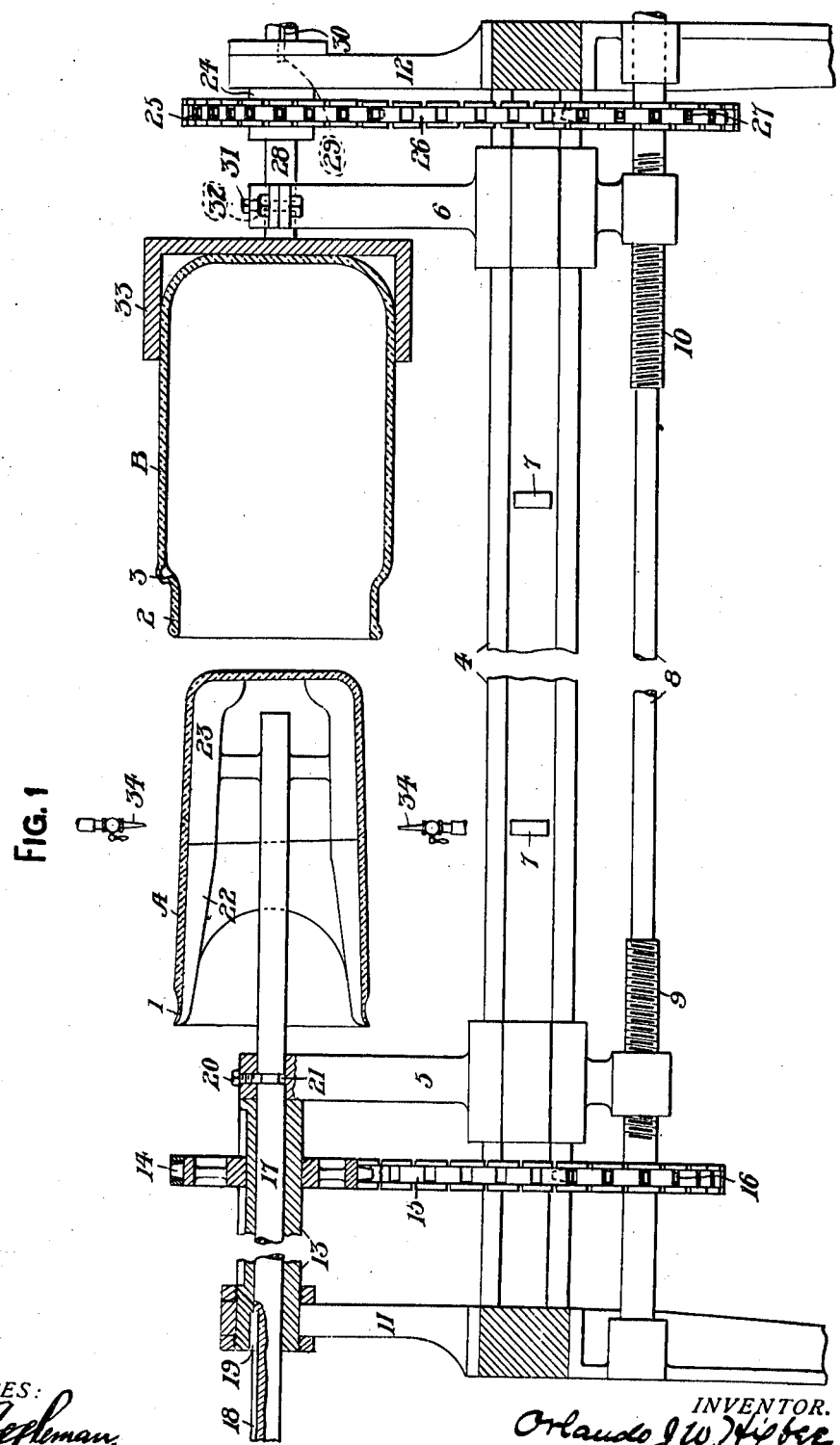

O. J. W. HIGBEE.
PROCESS OF MANUFACTURING HOLLOW WALL RECEPTACLES.
APPLICATION FILED MAR. 11, 1911.

1,004,259.

Patented Sept. 26, 1911.

3 SHEETS—SHEET 1.

WITNESSES:

INVENTOR.
Orlando J. W. Higbee
BY
Edward A. Lawrence
his ATTORNEY.

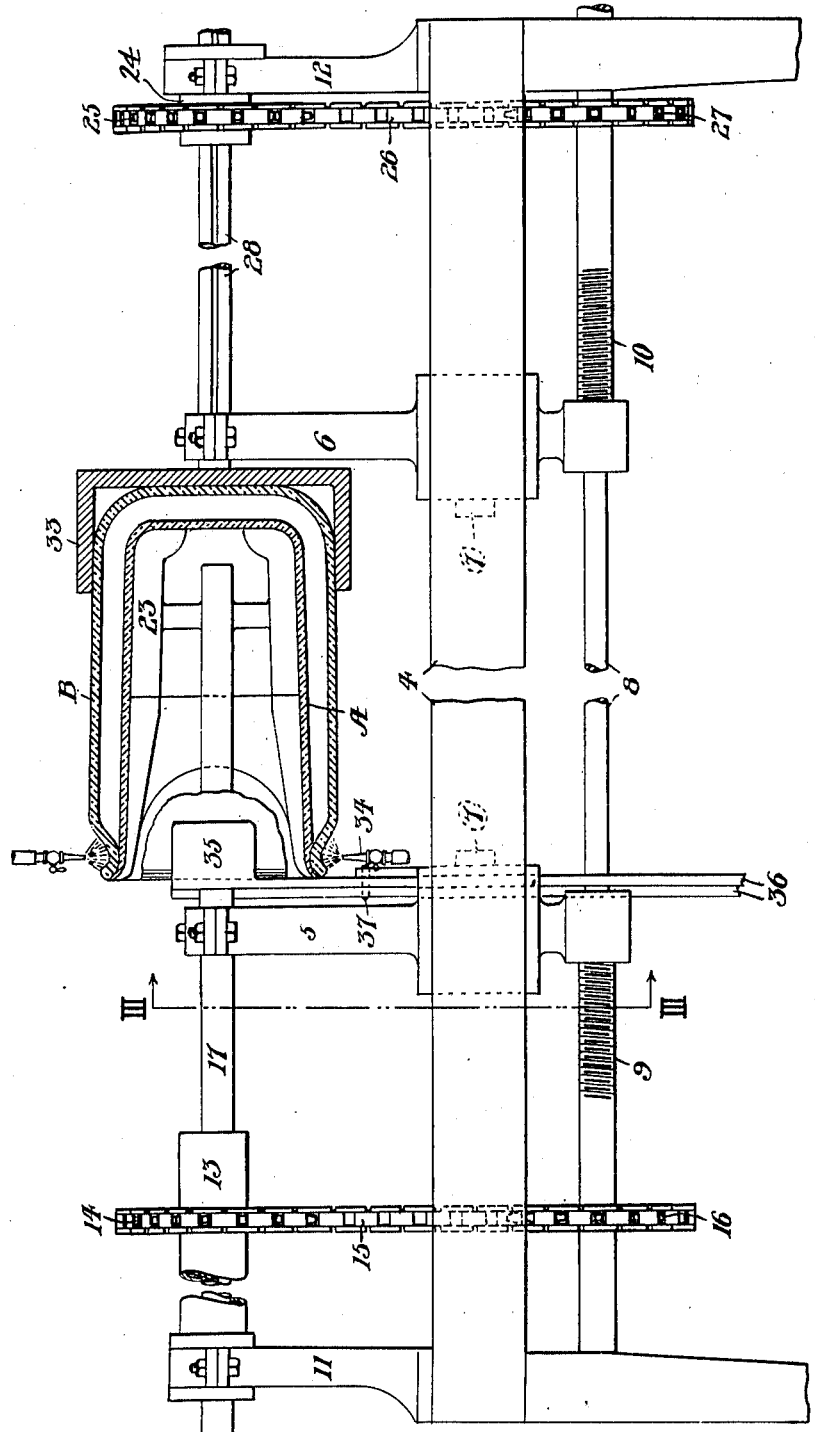

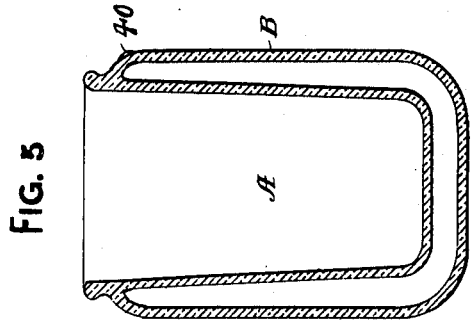
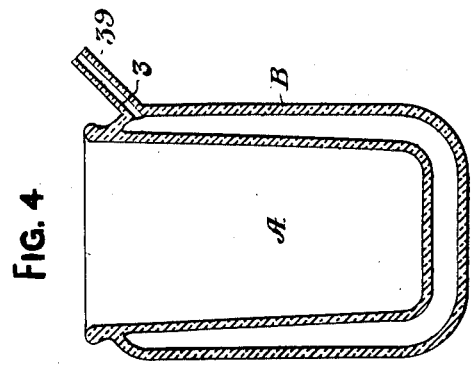
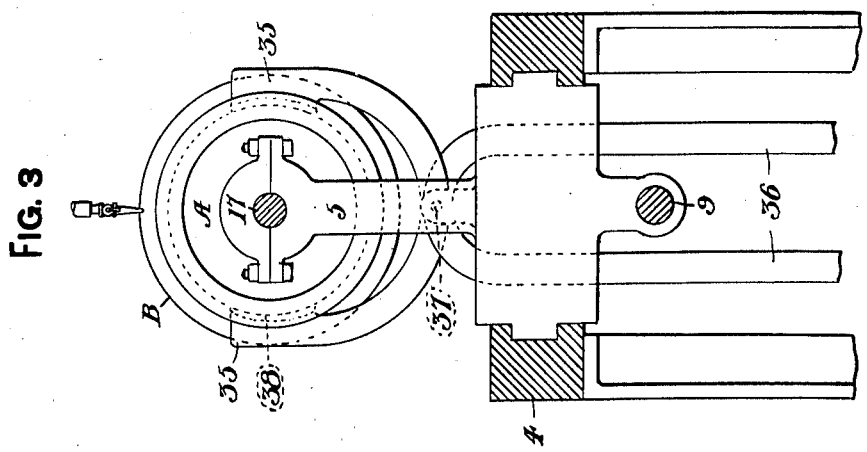

UNITED STATES PATENT OFFICE.

ORLANDO J. W. HIGBEE, OF PITTSBURG, PENNSYLVANIA.

PROCESS OF MANUFACTURING HOLLOW-WALL RECEPTACLES.

1,004,259.    Specification of Letters Patent.    Patented Sept. 26, 1911.

Application filed March 11, 1911. Serial No. 613,860.

*To all whom it may concern:*

Be it known that I, ORLANDO J. W. HIGBEE, a citizen of the United States, and residing in the city of Pittsburg, in the county of Allegheny and State of Pennsylvania, have invented or discovered new and useful Improvements in the Process of Manufacturing Hollow-Wall Receptacles, of which the following is a specification.

My invention consists in a new and improved process for manufacturing hollow wall receptacles of glass or similar material.

Generally speaking it consists in telescoping two hollow blanks and compressing and fusing together their walls adjacent to their necks while rotating the blanks in unison in the presence of heat. The blanks are preferably formed by blowing with closed bottoms, the outer blank being provided with a restricted neck and the inner blank being tapered from its mouth and provided with a circumferential depression adjacent to its mouth.

In the accompanying drawings, which illustrate a convenient manner of working my process, Figure 1 illustrates in side elevation, partially broken away in section for the sake of clearness, the inner and outer blanks mounted on a machine and ready to be telescoped together; Fig. 2 is a similar view showing the blanks telescoped and being attached together; Fig. 3 is a section along the line III—III in Fig. 2, showing the buffers which are omitted from the preceding figures for the sake of clearness; Fig. 4 is a vertical section showing the receptacle ready for the vacuum pump, and Fig. 5 is a similar view of the completed receptacle.

The following is a detailed description of the process as illustrated in the drawings.

A is the inner blank and B the outer blank, preferably blown separately of glass or similar material. The blank A is preferably tapered from its mouth and provided adjacent to its mouth with a circumferential depression 1. The blank B is preferably provided with a restricted neck 2 adapted to telescope over the mouth portion of blank A. The neck 2 preferably fits snugly over the mouth portion of blank A. In blowing or otherwise forming the outer blank B, I provide, preferably upon the shoulder of said blank, a hollow projection 3 which is broken through by means of a suitable tool after the blank is removed from the mold.

The machine upon which I prefer to perform the steps of telescoping and uniting the inner and outer blanks together consists of a bed plate 4 in which are slidably mounted the standards 5 and 6, the stops 7 and 7 serving to limit the movement of said standards toward each other. 8 is a power driven shaft journaled in said machine beneath the bed plate 4. The central portion of shaft 8 is of slightly reduced diameter and unthreaded but at either side of the plain portion of shaft 8 is a threaded portion 9 and 10 threaded in reverse directions. The shaft 8 passes through the bases of standards 5 and 6 and the threaded portion 9 of said shaft engages corresponding threads on the standard 5, while the threaded portion 10 of said shaft engages corresponding threads on the standard 6. It is thus evident that the rotation of the shaft 8 will advance the standards 5 and 6 toward each other, while a reverse rotation of the shaft 8 will cause the standards to retreat away from each other. When the rotation of the shaft 8 has advanced the standards 5 and 6 toward each other to the ends of the threads 9 and 10, the stops 7 and 7 engage said standards and prevent their further advance and hold them stationary until the shaft 8 is reversed and the threads 9 and 10 engaged with said standards to cause them to retreat.

11 and 12 are fixed standards on the ends of bed plate 4. In the standard 11 is journaled the hollow shaft 13 upon which is rigidly mounted the sprocket wheel 14 operatively connected by chain 15 to the sprocket wheel 16 fixed on shaft 8. Slidably mounted in the bore of shaft 13 is a smaller shaft 17 which is provided with a longitudinal slot 18 which is engaged by a key 19 seated in the wall of shaft 13, whereby said shaft 17 is caused to revolve with said shaft 13 but may be readily moved longitudinally therein. The shaft 17 is also journaled in the head of standard 5 and is prevented from sliding longitudinally therein by means of a pin or set screw 20 fixed in said standard and engaging a circumferential groove 21 in the shaft 17. It is thus evident that the shaft 17 is moved longitudinally by the movement of standard 5. The inner end of shaft 17 is provided with a mandrel 22, tapered to correspond to the blank A and provided on its inner end with an expanding clamp 23, operated by means not shown. The blank A is mounted on the mandrel 22 and clamped firmly thereon by clamp 23. In the opposite end standard 12 is journaled a hollow shaft 24 upon which is rigidly mounted a sprocket 25, of the same size as sprocket 14, which is operatively connected by a chain 26 with the sprocket 27, of the same size as sprocket 16, rigidly mounted on shaft 8.

28 is a smaller shaft slidably mounted in hollow shaft 24 and caused to rotate therewith by means of key 29 fixed in the wall of shaft 24 and engaging a longitudinal slot 30 in said shaft 28. The shaft 28 is also journaled in the sliding standard 6 and prevented from moving longitudinally therein by means of a pin or set screw 31 fixed in the standard 6 and engaging a circumferential groove 32 in said shaft 28. It is thus evident that the movement of the standard 6 will carry with it the shaft 28. On the inner end of shaft 28 is fixed the contracting clamp 33, operated by means not shown, in which the outer blank B is mounted.

The standards being in the position shown in Fig. 1, the inner blank A is mounted on the mandrel 22 and clamped thereon by means of clamp 23. The outer blank B is mounted in the contracting clamp 33. The shaft 8 is now rotated in the proper direction to cause the blanks A and B to approach and telescope each other until the positions shown in Fig. 2 are reached, the blanks being at the same time rotated in the same direction and at the same speed. The stops 7 and 7 will limit the movement of the blanks A and B.

34—34 represent one or more gas flame jets directed to impact their flames against the telescoping necks of the blanks A and B, when they have reached the positions shown in Fig. 2.

35—35 represent a pair of buffer heads mounted on the outer ends of curved arms 36—36 which are pivoted together by bolt 37 which preferably extends from the front face of standard 5. By compressing the lower ends of arms 36—36 the buffers 35—35 are forced down upon the neck of the outer blank B, forcing the material thereof into close contact and fusion with the material of the blank A, filling the circumferential depression 1 in the neck of blank A. The buffers are preferably recessed, as at 38 to form a bead on the outer edge of the neck 2 of blank B, the formation of such bead resulting in a kneading action on the glass or other material and more firmly uniting the two blanks together. The rotation of the reheated blanks under the buffers 35—35, which are applied by constant pressure by means of a hand lever, foot treadle or other convenient means, which pressure is resisted by the mandrel 22, results in the union of the walls of the two blanks together into an integral common neck, making the neck portion of the receptacle of the greatest strength. When the necks of the two blanks A and B have been completely united and fused together, the rotation of the shaft 8 is stopped, the buffers 35—35 spread away from the neck of blank B and the gas jets cut off. The clamp 33 is now loosened from the blank B and the shaft 8 rotated in the opposite direction, the standards 5 and 6 being thrown into engagement with the threaded portions of shaft 8. The shafts 17 and 28 are thus caused to retreat from each other, the united blanks A and B being mounted on the mandrel 22. When the elements of the machine have reached the relative positions shown in Fig. 1, the shaft 8 is halted and by the retraction of the clamp 23 the combined blanks A and B are removed from the tapered mandrel 22. A tube 39 is now fused or otherwise attached to the broken open hollow projection 3 and a vacuum pump, not shown, connected with said tube to exhaust the air contained between the walls of blanks A and B. When said vacuum has been established, the tube 39 and projection 3 are sealed and fused off, as at 40 in Fig. 5 to permanently establish and maintain the vacuum. The receptacle is now completed.

My process is particularly applicable to the manufacture of receptacles of relatively large capacity which could not be manufactured readily by the other processes now in use for the manufacture of vacuum wall receptacles, but smaller receptacles or bottles can be also made by my process.

The vacuum receptacle made by my process is particularly strong and resists such strains and jars which result in fracture and destruction of the forms of vacuum wall bottles now in general use, the solid neck preventing undue vibration of the inner blank or bottle, so that no supports or plugs need be introduced between the walls as is now the general practice.

Although, for the sake of clearness, I have minutely described the accompanying drawings, I do not wish to be limited thereby but claim broadly—

1. The process of manufacturing hollow wall receptacles which consists in, first, separately forming an inner blank and an outer blank, then telescoping the outer blank over the inner blank mounted on a support, and then in one operation reheating and compressing together into fusion the walls of said blanks adjacent to their mouths against said support.

2. The process of manufacturing hollow wall receptacles which consists in, first, separately forming an inner blank and an outer blank, then telescoping the outer blank over the inner blank mounted on a support, then in one operation reheating and compressing together into fusion the walls of said blanks adjacent to their mouths against said support, and then establishing and sealing a vacuum between the walls of said blanks.

3. The process of manufacturing hollow wall receptacles which consists in, first, separately forming an inner blank and an outer blank having closed bottoms and said outer blank having a restricted neck adapted to fit over the mouth of the inner blank, then telescoping said outer blank over said inner blank, and then reheating said blanks and compressing said neck into fusion with the wall of said inner blank.

4. The process of manufacturing hollow wall receptacles which consists in, first, separately forming an inner blank and an outer blank having closed bottoms and said outer blank having a restricted neck adapted to fit over the mouth of the inner blank, then telescoping said outer blank over said inner blank, then reheating said blanks and compressing said neck into fusion with the wall of said inner blank, and then establishing and sealing a vacuum between the walls of said blanks.

5. The process of manufacturing hollow wall receptacles which consists in, first, separately forming an inner blank having a circumferential groove adjacent to its mouth and an outer blank having a restricted neck adapted to fit over the mouth of said inner blank and both blanks having closed bottoms, then telescoping the outer blank over the inner blank, and then reheating said blanks and compressing said neck into fusion with the grooved mouth of the inner blank.

6. The process of manufacturing hollow wall receptacles which consists in, first, separately forming an inner blank having a circumferential groove adjacent to its mouth and an outer blank having a restricted neck adapted to fit over the mouth of said inner blank and both blanks having closed bottoms, then telescoping the outer blank over the inner blank, then reheating said blanks and compressing said neck into fusion with the grooved mouth of the inner blank, and then establishing and sealing a vacuum between the walls of said blanks.

7. The process of manufacturing hollow wall receptacles which consists in, first, separately forming an inner blank and an outer blank having closed bottoms, telescoping said outer blank over said inner blank mounted on a support, and then reheating said blanks and compressing together the mouths of said blanks into fusion against said support while said support is rotated.

8. The process of manufacturing hollow wall receptacles which consists in, first, separately forming an inner blank and an outer blank having closed bottoms, telescoping said outer blank over said inner blank mounted on a support, then reheating said blanks and compressing together the mouths of said blanks into fusion against said support while said support is rotated, and then establishing and sealing a vacuum between the walls of said blanks.

9. The process of manufacturing hollow wall receptacles which consists in, first, separately forming an inner blank and an outer blank having closed bottoms and the outer blank having a restricted neck adapted to fit over the mouth of the inner blank, then telescoping the outer blank over the inner blank mounted on a support, and then reheating said blanks and compressing said neck into fusion with the wall of the inner blank while said support is rotated.

10. The process of manufacturing hollow wall receptacles which consists in, first, separately forming an inner blank and an outer blank having closed bottoms and the outer blank having a restricted neck adapted to fit over the mouth of the inner blank, then telescoping the outer blank over the inner blank mounted on a support, then reheating said blanks and compressing said neck into fusion with the wall of the inner blank while said support is rotated, and then establishing and sealing a vacuum between the walls of said blanks.

11. The process of manufacturing hollow wall receptacles which consists in, first, separately forming an inner blank and an outer blank having closed bottoms, the inner blank being provided with a circumferential groove adjacent to its mouth and the outer blank having a restricted neck adapted to fit over the mouth of the inner blank, then telescoping the outer blank over the inner blank mounted on a support, and then reheating said blanks and compressing said neck into fusion with the grooved wall of said inner blank while said support is rotated.

12. The process of manufacturing hollow wall receptacles which consists in, first, separately forming an inner blank and an outer blank having closed bottoms, the inner blank being provided with a circumferential groove adjacent to its mouth and the outer blank having a restricted neck adapted to fit over the mouth of the inner blank, then reheating said blanks and compressing said neck into fusion with the grooved wall of the inner blank, and then establishing and sealing a vacuum between the walls of said blanks.

Signed at Pittsburg, Penna., this 2nd day of March, 1911.

ORLANDO J. W. HIGBEE.

Witnesses:
 EDWARD A. LAWRENCE,
 T. CHALMERS DUFF.